United States Patent
Levesque

Patent Number: 5,417,910
Date of Patent: May 23, 1995

[54] METHOD FOR SECURING FLARED OR COMPRESSION TUBE FITTINGS

[76] Inventor: Michael D. Levesque, P.O. Box 1504, Seal Cove Rd., Southwest Harbor, Me. 04679

[21] Appl. No.: 99,699

[22] Filed: Jul. 30, 1993

Related U.S. Application Data

[63] Continuation-in-part of Ser. No. 785,784, Oct. 31, 1991, abandoned.

[51] Int. Cl.⁶ ............... B29C 39/18; B29C 70/72; F16L 55/175
[52] U.S. Cl. ................... 264/263; 264/261; 264/262; 264/267; 425/116
[58] Field of Search ............ 264/261, 267, 269, 275, 264/263, 271.1, 262, 277; 29/458; 425/116

[56] References Cited

U.S. PATENT DOCUMENTS

| | | | |
|---|---|---|---|
| 1,663,922 | 6/1927 | Carter | 264/263 |
| 2,379,793 | 7/1945 | Eenigenburg | 264/275 |
| 3,148,011 | 9/1964 | Brown | 264/263 |
| 3,226,463 | 12/1965 | Wallace | 264/279 |
| 3,287,485 | 11/1966 | McCord | 264/263 |
| 3,343,252 | 9/1967 | Reesor | 29/458 |
| 3,498,866 | 3/1970 | Kilbane | 29/458 |
| 3,892,032 | 7/1975 | Bagnolo | 29/458 |
| 4,011,652 | 3/1977 | Black | 29/458 |
| 4,120,083 | 10/1978 | Echols | 29/458 |
| 4,554,721 | 11/1985 | Carty et al. | 29/458 |
| 4,789,512 | 12/1988 | Hughes | 264/272.15 |

*Primary Examiner*—Jan H. Silbaugh
*Assistant Examiner*—Angela Ortiz

[57] ABSTRACT

A method of locking an established flared or compression fitting by the use of a form consisting of two identical halves shaped and dimensioned freely to accommodate the fitting and adjacent portions of the tubing ends. Supplies of the two components forming, when mixed, a volume of epoxy resin such that if contained within the form when assembled about a fitting, overfills the form. Approximately one half of the resin is poured into each of the two halves which are then assembled about the fitting with excess resin extruded at least through the ends of the form. When the resin is hardened it locks the fitting and the peripheral nut surfaces preventing the loosening of the fitting nuts.

2 Claims, 1 Drawing Sheet

METHOD FOR SECURING FLARED OR COMPRESSION TUBE FITTINGS

The present invention is a continuation in part of application Ser. No. 785,784 filed Oct. 31, 1991 now abandoned.

BACKGROUND OF THE INVENTION

Sections of tubing between sources of fluids, typically gases under pressure and an appliance often have connections which are either joints or fittings.

A joint is a connection that is either threaded or welded and is most often used with rigid pipe. A fitting is most often found on tubing and forms the seal with compression or a flare. Fittings require at least one nut but more often contain two or more.

Leaks in fittings occur for a variety of reasons and often such leaks are difficult and expensive to locate and repair. As far as I am aware, there is no way prior to the present invention by which an established fitting, whether compression or a flared fitting, can be so locked as to ensure against leaking.

THE PRESENT INVENTION

The general objective of the present invention is to provide a method by which a fitting and the nuts thereof can be so effectively locked that the fittings and nuts will not vibrate loose or suffer a failure as a result of hazards to which such fittings are, from time to time, exposed. The failure of fittings caused by hazards such as vibration, galvanic corrosion, tampering, stress due to temperature changes will be effectively eliminated by the use of the invention.

In addition, the invention provides a form by which the locking of fittings is facilitated. The form consists of two identical halves of high density plastic. The form halves are shaped and dimensioned to be fitted together about a fitting then to freely accommodate the fitting and closely, but freely, encircle the adjacent end portions of the tubing.

A supply of two components is provided which, when mixed thoroughly, forms a volume of an epoxy resin in excess of that required to fill the form when assembled about the fitting. Approximately one half of the epoxy mixture is placed in each half of the form. The mixture has a consistency of putty and adheres to the two form halves and around the fitting and nuts. The two halves are then assembled about the fitting and pressed together to lock it and with the excess resin displaced between the sides and ends of the two halves and the encircled tubing. Unwanted displaced resin is then easily removed at this time. When the epoxy resin has set, the forms and fitting become locked.

It is necessary that, at least until the epoxy resin begins to set, the two halves be held together not only to prevent one moving lengthwise relative to the other but also to prevent the two halves from separating. For those purposes, each half has a spaced apart pair of alignment tabs and midway of one side and the other side has a single centrally located tab so that when one half is reversed relative to the other, each single tab of either half may enter between the pairs of the other half. The tabs are so formed that they are interlocked as they are pressed together.

BRIEF DESCRIPTION OF THE DRAWINGS

The accompanying drawings illustrate a presently preferred embodiment of the invention

PREFERRED EMBODIMENT

Figure 1:
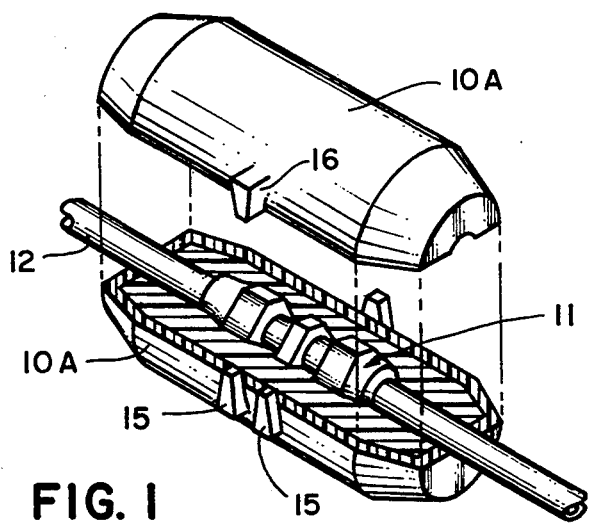
FIG. 1 is a perspective view of the identical halves of the form which when fitted together contain the flared or compression fitting and the epoxy resin.
Figure 2:
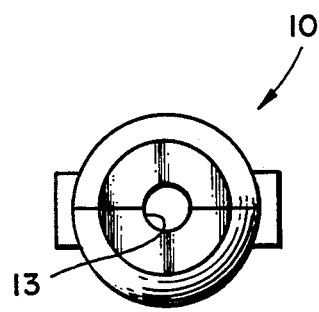
FIG. 2 is an end view of the assembled form.
Figure 3:
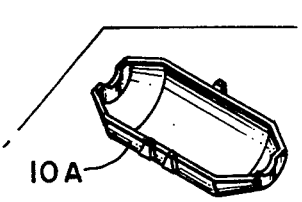
FIG. 3 is a perspective view showing the interior of one form and also illustrates the preparation of epoxy resin to be placed therein.
Figure 4:
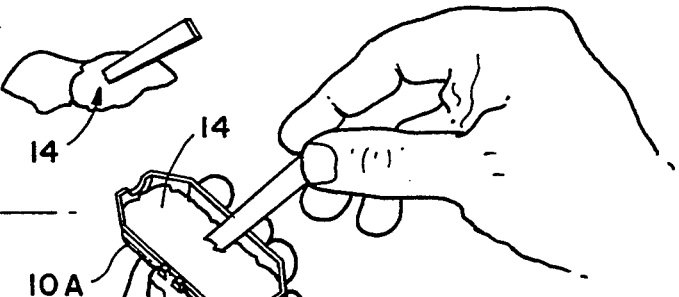
FIG. 4 is a like view illustrating the additional view of epoxy resin to one of the halves.

The practice of the present invention requires the use of a form generally indicated at 10 and consisting of two identical halves 10A to be assembled about a flared or compression fitting 11 interconnecting the ends 12 of lengths of tubing. Polycarbonate is a preferred high density plastic for the form halves 10A.

The form 10, when assembled, is shaped and dimensioned freely to accommodate the flared or compression fitting 11 and to provide end ports 13 which are dimensioned to encircle closely but freely the tubing ends 12. In practice, the forms are of two sizes, one for tubing in the three eighths to one half inch range and the other for tubing in the five eighths to three quarter inch range. The fitting 11 may be either a flared type or a compression type which differ as to their displacement effects.

A supply is provided of the two components which, when mixed together, form an epoxy resin which will adhere to the form halves 10A and to the fitting and nuts 11 and of a volume which would overfill the form 10 if fitted about the fitting 11. A suitable material is a high compression, non-conductive modified Polyamine locking compound resin.

The two epoxy components are thoroughly mixed to form a mass having the consistency of putty 14 and approximately one half of that mass is introduced into each form half 10A to which it adheres and which, when leveled, fills the halves below the end recesses which in the assembled form establishes the ports 13.

Figure 5:
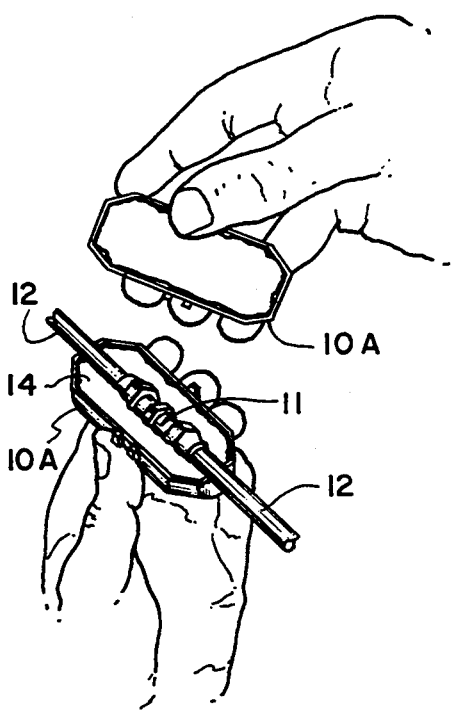
FIG. 5 is a view against the flared or compression fitting and ends of the tubing and the other half about to be fitted over the flared or compression fitting and tubing ends.
Figure 6:
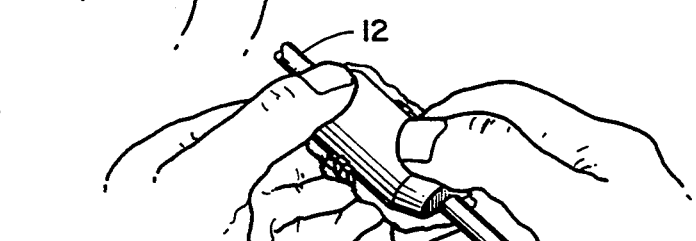
FIG. 6 is another perspective view illustrating the assembled form held together with the excess resin displaced.

One form 10A is then fitted against the fitting 11 and is held in place, see FIG. 5, while the other form 10A is fitted over the fitting 11 and, see FIG. 6, is held to complete the form 10 with resin displaced between the form halves and about the tubing in the ports 13. Displaced resin can be easily removed, and cleaned with an alcohol pad.

The epoxy resin starts to set in about 45 minutes but it is necessary that the form halves 10A be held together until the resin has become so set that relative lengthwise and hex nut movements cannot occur which could defeat the locking of flared or compression fittings and nuts 11.

Figure 7:
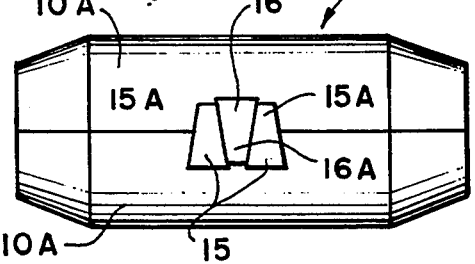
FIG. 7 is a side view of an assembled form illustrating the connections between the halves at one side of the form.

To that end, each form half 10A has midway of one side, a spaced pair of tabs 15 and centrally of the other side a single tab 16 positioned for entry between the pair of tabs 15 of the other form half 10A when one form half 10A has its position reversed relative to the other form half, see FIG. 7. In order that the two halves, when assembled about the fitting and nuts 11, will remain interconnected until the resin has set to lock the two halves together, the tabs 15 and 16 are slightly tapered with the wider end of 15A of the tabs 15 protruding above the form half 10A of which they are a part and taper with proximate edges diverging while the width of tabs 16 increases towards their free ends so that the two halves 10A become securely interconnected when assembled about the fitting 11 and manually pressed together to force the tabs 16 between the pairs of tabs 15.

I claim:

1. A method of joining tube ends using a flared or compression fitting having at least one nut, and forming a locked fitting, said method also securing the fitting from leaking due to loosening caused by tampering, vibrations or galvanic corrosion or stress due to temperature changes, comprising:

interconnecting said tube ends using said flared or compression fitting and said nut;

providing a permanent form in two identical halves constructed for enclosing the fitting while leaving molding space around said fitting, said nut, and adjacent tube ends;

mixing components forming an epoxy resin material which is able to set;

filling the halves of the permanent form with said resin material while said resin is set to a consistency of putty;

fitting the resin filled halves together over the fitting and tube ends, thereby completing the permanent form about the fitting and tube ends;

displacing any excess resin material from the permanent form;

and hardening the resin material, thereby locking said fitting and securing said nut against loosening due to tampering, vibration, or galvanic corrosion, or stress due to temperature changes;

and leaving the permanent form in place over said fitting, nut and tube ends contained in the permanent form.

2. The method of claim 1 further comprising the steps of:

fitting said halves of said permanent form together using complementary tapered tabs formed on adjoining surfaces of the halves of the permanent form, holding said halves of the form to prevent longitudinal or separating movements of said halves relative to each other using said complementary tapered tabs until said resin has hardened.

* * * * *